United States Patent [19]

Grima et al.

[11] Patent Number: 5,042,030
[45] Date of Patent: Aug. 20, 1991

[54] APPARATUS FOR REARRANGING SIGNAL CHANNELS OF A MULTI-LOOP TIME-DIVISION MULTIPLEXED TRANSMISSION SYSTEM

[75] Inventors: Jean-Claude Grima, Chatillon; Gabriel Bretez, Le Plessis Robinson, both of France

[73] Assignee: U.S. Philips Corp., New York, N.Y.

[21] Appl. No.: 416,810

[22] Filed: Oct. 4, 1989

[30] Foreign Application Priority Data

Oct. 7, 1988 [FR] France .................. 88 13189

[51] Int. Cl.[5] .................. H04J 3/02
[52] U.S. Cl. .................. 370/85.1; 370/16; 370/84; 370/85.12
[58] Field of Search .................. 370/16, 85.12, 85.9, 370/85.1, 85.2, 84

[56] References Cited

U.S. PATENT DOCUMENTS

| | | | |
|---|---|---|---|
| 3,796,835 | 3/1974 | Closs et al. | 179/15 BY |
| 4,383,314 | 5/1983 | Tam | 370/85.12 |
| 4,398,285 | 8/1983 | Lutz et al. | 370/16 |
| 4,460,994 | 7/1984 | Scanlon et al. | 370/85.12 |
| 4,486,878 | 12/1984 | Havermans | 370/60 |
| 4,520,479 | 5/1985 | Grima et al. | 370/84 |
| 4,536,870 | 8/1985 | Bovo et al. | 370/16 |
| 4,592,095 | 5/1986 | Fundneider | 370/58 |

Primary Examiner—Douglas W. Olms
Assistant Examiner—Dang T. Ton
Attorney, Agent, or Firm—Anne E. Barschall

[57] ABSTRACT

Apparatus for rearranging signal channels of a multi-loop TDM transmission system, each loop having a plurality of high rate channels CI in successive base frames, portions of successive base frames forming a plurality of low rate channels CS. The system capacity can thereby readily be expanded by including additional loops. In order to rearrange a plurality p of asynchronous TDM signals into the correct channels to constitute a plurality of synchronous outgoing TDM signals, the apparatus includes respective units SRI for providing synchronization and rearrangement of the signals in the high rate (CI) channels. The p outputs of the SRI units are connected to p respective inputs of an interloop switching unit CII for switching the CI channels, and also to p respective inputs of an interloop switching unit RCIS which rearranges and switches the CS channels. The p outputs of the unit CII and the p outputs of the unit RCIS are paired, the respective pairs being supplied to respective combination circuits which combine the signals in each pair to derive the respective synchronous multiplexed outgoing signals.

6 Claims, 8 Drawing Sheets

APPARATUS FOR REARRANGING SIGNAL CHANNELS OF A MULTI-LOOP TIME-DIVISION MULTIPLEXED TRANSMISSION SYSTEM

BACKGROUND OF THE INVENTION

1. Field of the Invention

The present invention relates to an apparatus for rearranging information in a communication system comprising a plurality of loops for transmitting a plurality p of outgoing time-division multiplexed information signals containing information obtained from a plurality p of incoming asynchronous time-division multiplexed digital information signals, such signals being identical as regards their configuration and being included in fast and slow rate channels CI and CS respectively, the fast rate channels CI being formed by time slots arranged in a base frame, the slow rate channels CS being formed by time slots distributed in successive base frames and arranged in a multiframe comprising a plurality of base frames. The information rearranging apparatus has p respective data inputs E1, E2, ..., Ep for the incoming multiplexed signals and p respective data outputs S1, S2, ..., Sp for the outgoing multiplexed information signals.

The apparatus may be employed in a local area network, that is to say, a digital communications system including telephony, specifically telephone communication, and data transmission; it may be used in business undertakings such as offices, factories or the like or aboard vessels, and permits considerable reduction of the amount of necessary wiring while permitting simultaneous transmission of a large number of independent communications.

2. Description of the Related Art

French Patent Specification 2 526 614 in the name of the Applicants, which corresponds to U.S. Pat. No. 4,520,479, discloses a time division multiplexed communication system comprising a single closed loop. This system permits, with conventional technology and a moderate multiplex rate, to connect in series in the loop about a hundred connecting units, denoted as concentrators, each concentrator being connected to about fifteen subscribers, which is suitable for approximately 1500 to 2000 users connected to the system. If the number of users exceeds 2000, this will then pose the general technical problem of enhancing the capacity of the system. This problem may be solved, as one of the possible solutions, by modifying the system architecture.

SUMMARY OF THE INVENTION

The solution provided by the invention is to provide a TDNL system comprising a plurality of loops which all pass through a central unit called a superpilot.

This solution, for enhancing the capacity of the local network, provides the advantage of retaining the same characteristics for the time-division multiplexed signals in all the various loops as in single loop; the concentrators can also remain the same, which makes it possible to enhance the capacity of a single loop system in a very simple way, first by adding concentrators at an arbitrary place in such loop and then by introducing one or more additional loops and superpilot apparatus as described herein.

The aforementioned technical problem, in the case of such a multiloop system, is to permit any user of the system to communicate with any other user or be able to teleconference while augmenting to the least possible extent the transmit time of the information signals between users.

According to the invention the technical problems indicated hereinbefore are solved because the superpilot apparatus, which is apparatus for rearranging information as indicated in the first paragraph, is characterized in that the p data inputs thereof are connected to respective units SRI for synchronising the p incoming multiplexed signals and rearranging the information signals of the high rate channels CI, and in that the p outputs of the units SRI are connected in parallel to p inputs of an interloop switching unit CII for the channels CI, the unit CII comprising a first switching matrix, and to p inputs of a unit RCIS for rearranging and interloop switching of the low rate channels CS, this unit RCIS comprising delay units and a second switching matrix. The p information outputs of the unit CII are paired with the p information outputs of the unit RCIS, the respective pairs of outputs being connected to first and second input terminals of respective combination circuits. The p combination circuits produce at their respective outputs S1, S2, ..., Sp, the said p outgoing synchronous multiplexed signals.

The basic idea of the invention consists of first synchronising the incoming multiplexed signals appearing at the inputs of the apparatus and which have different time shifts and, subsequently, transmitting to separate units according to the desired loop configuration(s) the information relating to the actual information channels (the CI channels) and also the information relating to the signalling channels (the CS channels) which are rearranged simultaneously.

It should be observed that rearrangement of the channels CI, which are the fast rate information channels, is effected at the input of the apparatus by the units SRI. When a switching configuration in the unit CII interconnects a number of loops, for example 3, which have time shifts for which the closing and opening of 3 switches is necessary, a long loop is thus created provisionally, constituted by these three elementary loops through which the rearrangement of the channels CI is effected three times in succession by 3 different SRI units, which trebles the information rearranging time compared to that of a single loop. For an elementary information rearranging time equal to a base frame, for example 250 μs, it is certainly tolerable if the number of elementary loops to be interconnected remains low, which is usually the case. Alternatively, the rearranging time of the signals in channel CS is long, preferably equal to the time of the multiframe and, for example, equal to 64 ms for a single-loop system. It is not advisable to augment this time, as a result of an interconnection of various elementary loops, so as to avoid the phenomenon of echoes occurring for the user stations incorporated in the long loop created by the aforesaid interconnection configuration.

In order to obviate the constraint mentioned in the preceding paragraph, an advantageous embodiment of the invention is characterized in that each of the p inputs of the said rearranging and interloop switching unit RCIS for the channels CS is connected to a line comprising p series-arranged delay units, and in that the output of each delay unit is connected to a column of the said second switch matrix of which each line is connected to one of the p outputs of the RCIS.

With this structure for the unit RCIS it is then possible for a system comprising 4 loops, for example, in steps of 0.25; 0.5; 0.75, to modulate the rearranging time of the channels CS by means of an elementary loop and to provide, for a multiloop configuration for a given multiloop signalling channel, this configuration being spread in time owing to the opening and closing of the associated switches of the matrix, that the accumulative delays introduced for the rearrangement of the channels CS of the elementary loops is equal to the delay for a single loop, that is, equal to the time of the multiframe. In this case the running numbers of the channels CS in the different elementary loops constituting the multiloop are different of necessity, which, for that matter, does not cause any routing difficulty of the signalling channel in the specified multiloop.

According to a preferred embodiment of the invention the units CII and RCIS are managed from control means constituted by a switch memory which allows to read the switch configurations of their switching matrix. For this purpose, each one of these two memories is written from an address bus and a data bus connected to a central microprocessor arranged in the superpilot. The switch memory for unit CII is read from a channel counter CI and the switch memory for unit RCIS from a channel counter CS, each configuration of interloop signalling switchings being spread in time over the period of time of a multiframe relative to the multiplexed signals of the different loops of the interloop configuration.

BRIEF DESCRIPTION OF THE DRAWING

The following description refers to the annexed drawings, given by way of example, to make it better understood how the invention can be realised therein.

DESCRIPTION OF THE PREFERRED EMBODIMENTS

Figure 1A:
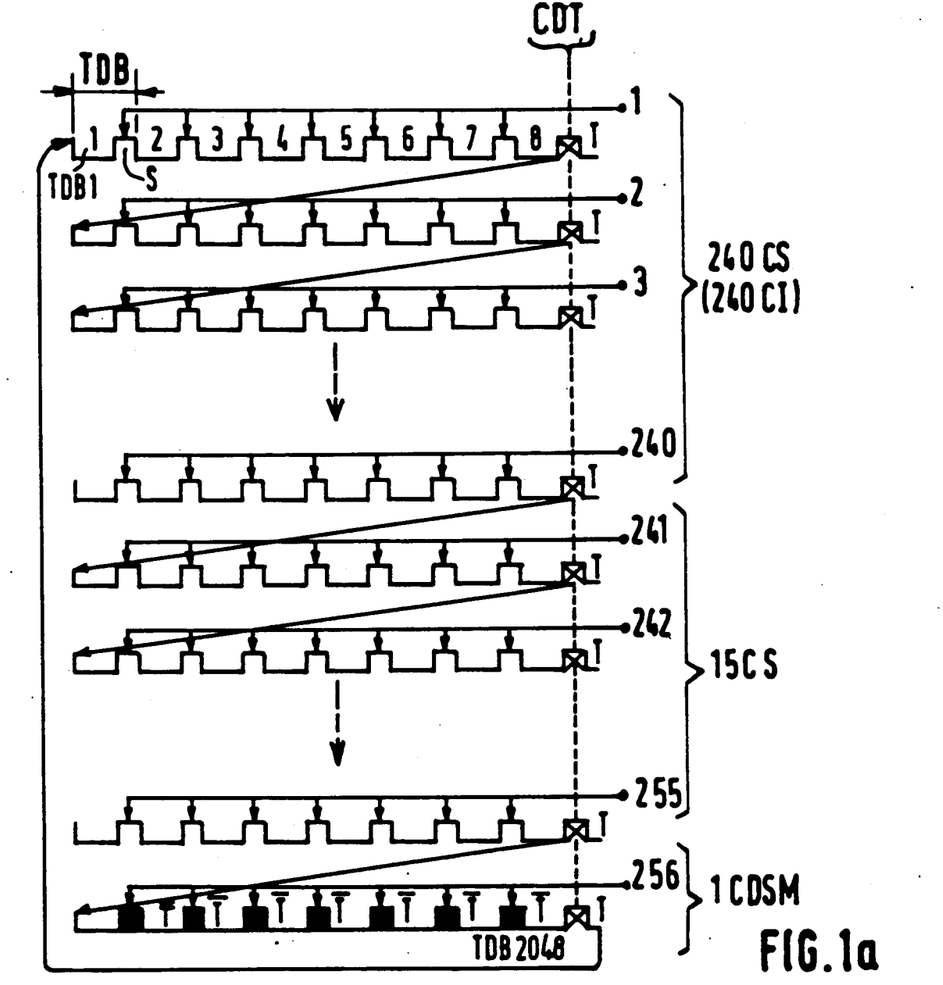
FIG. 1a and 1b show the organisation of a time-division multiplexed signal, FIG. 1a showing the set of multiplexed signals and FIG. 1b the base frame.
Figure 1B:
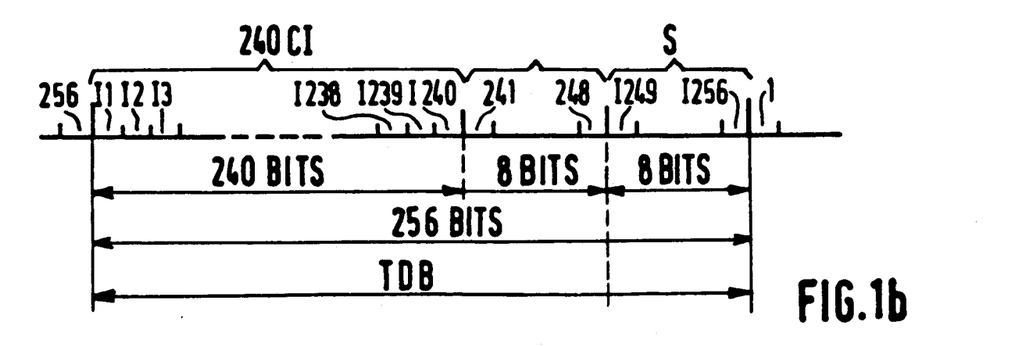

FIGS. 1a and 1b show the organisation of a time-division multiplexed signal having two types of channel, that is, a fast and a slow rate channel.

As shown in FIG. 1b, the fast rate channels, which are intended in essence for the actual transmission of information (information channels CI) are constituted by time slots I1, I2, I3, . . . , I240 of a base frame TDB. In practice these time intervals each contain a bit whose duration is equal to 122 ns.

The slow rate channels (signalling channels CS) are each constituted by various separated time slots S, respectively situated each at the end of a base frame after the time slot I248. These time slots S each contain 8 bits referenced I249 to I256. Eight successive base frames constitute a slow rate channel frame, as shown in each line of FIG. 1a. The slow rate signalling channel CS1 is formed by the set of time slots S of the base frames TDB1 to TDB7; the channel CS2 is formed by the time slots S of the base frames TDB9 to TDB15, nd so on. The time slots S of the base frames TDB8, TDB16, . . . TDB2048, that is, the eight bits terminating each such frame, contain the frame code T used for defining the time intervals I1, I2, . . . , I240. The intervals S of the base frames TDB2041 to TDB2047, the last seven frames of the multiframe signal, contain the multiframe code $\overline{T}$, the complement of code T, which permits to number the different frames to 256, the set of these frames constituting the multiframe of which the duration is for example, equal to 64 ms. The forming of each frame of a signalling channel CS thus requires a sequence of eight successive base frames as far as its periodicity is concerned. The multiframe comprises, among the 256 signalling channels CS, 240 channels (CS1, CS2, . . . , CS240) reserved for the users, corresponding with 240 information channels CI of each base frame (CI1, CI2, . . . , CI240). The bits 241 to 248 of each base frame are tone bits which do not play a particular role for this invention. Likewise, in order not to make this exposition too complex, the nature of the 15 channels having the same structure as the signalling channels CS, 241, . . . , 255 will not be explained here any further.

In order to simplify the comprehension of the multiloop communication system, several characteristic features of the time division multiplexed signal for each loop will be summed up hereinbelow:

| | |
|---|---|
| Bit rate of an information channel (fast rate): | 32 kbits/s |
| Number of base-informational channels: | 240 |
| Transmission rates available for the users (by possibly grouping 2, 4, 8, 16 or 32 adjacent CIs: | 32, 64, 128, 256, 512 or 1024 kbits/s |
| Repetition rate of the frame code T: | 4000 /s |
| Length of the frame code: | 8 bits |
| Mean bit rate of a signalling channel at 7 octets (56 bits) per frame | 875 bits/s |
| Bit rate of the multiplexed signal: | 8.192 MHz |
| Multiframe period: | 64 ms |
| Frame period: | 250 μs |
| Bit period: | 122 ns. |

If time-division multiplex is used (for example, the one described hereinbefore) in a looped telecommunication system, for example, comprising a single loop, it is necessary to rearrange the information by means of an information rearranging apparatus situated at a point in the loop. The system permits to exchange information between different connection circuits (concentrators) 2, 3, . . . , see FIG. 2, linked by a transmission line 10 (coaxial cable or optical fibre), which is looped back by means of a rearranging apparatus which at input terminal 12 receives the incoming multiplexed signal phase-shifted by several bits and produces at output terminal 11 the outgoing multiplexed signal rearranged by means of associated delay means which, as regards the incoming multiplexed signal, are different for the information channels CI and the signalling channels CS.

Figure 2:
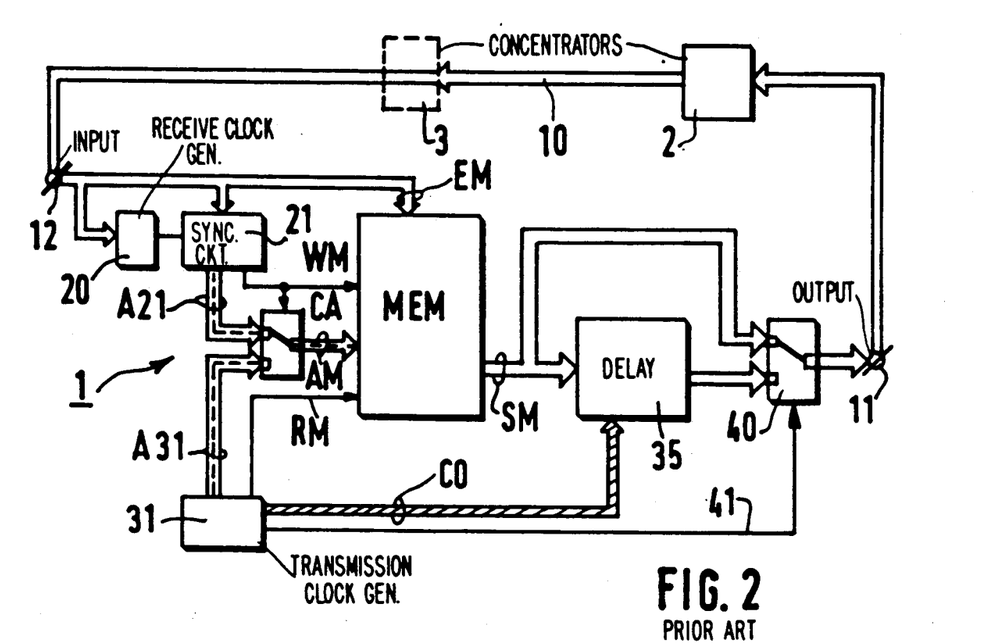
FIG. 2 is a block diagram of a prior-art multiplex rearranging apparatus in a single loop.

FIG. 2 shows by way of a diagram a prior-art rearranging apparatus 1 which permits to shift the multiplexed signal received over the transmission line 10 at the input terminal 12 in order to have it coincide with the channels of the multiplex signal to be transmitted at output terminal 11. A clock circuit 20 recovers the timing of the information signals appearing at terminal 12 and supplies its signals to a synchronisation circuit 21 which, while detecting the frame code T and multiframe code $\overline{T}$, successively processes the signals so as to write them into a memory MEM for all the incoming multiplexed information signals. This memory has a data input EM connected to the input 12 and has an output SM. The memory MEM also receives a write command WM, an address bus AM and a read command RM.

In order to determine the timing of the outgoing multiplexed signal (transmission clocks), a clock signal generator 31 comprising a quartz oscillator is provided. This generator produces the addresses and the read command RM of the memory MEM. The read and write addresses are transported over the buses A21 and A31 respectively, coming from the respective circuits 21 and 31. These buses transmit a modulo-256 binary figure which figure evolves with the timing of the incoming or outgoing multiplexed signal. A switch CA controlled via the write wire WM of the memory MEM determines which of the address codes of the bus A21 or A31 is applied to the address bus of memory MEM.

To the output SM of memory MEM is connected a delay unit 35 which selects only the multiplexed signal bits contained in the time slots S and which delays these bits by 16320 times the average period during which the bits contained in the time slots S appear in the multiplexed signal, that is to say for the duration of 255 frames. A combination circuit (switch 40), when in the position represented in the Figure, enables transmission of at least the information of the channels CI of the output multiplexed signal at terminal 11, the latter then being directly connected to the output SM. When the switch 40 has assumed the other positions, it enables transmission of the information of the signalling channels CS, plus the codes T and $\overline{T}$, in the multiplexed signal since the terminal 11 is then connected to the output of the delay unit 35. The operating sequence of the switch 40 is controlled over by means of a conductor 41 transporting a clock signal coming from the transmission clock generator 31. What has just been described permits to effect in a known manner two types of rearrangement for the loop 10, as explained with reference to the FIGS. 3 and 4, the rearrangement of information signals, which are fast signals, the arrangement of signalling signals which are slower signals.

Figure 3:
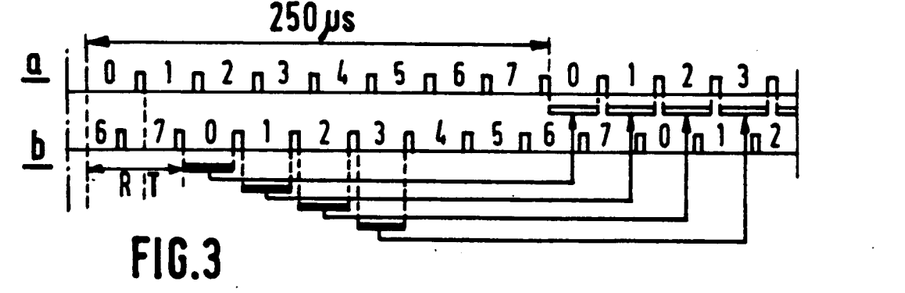
FIGS. 3 and 4 are time diagrams showing at a the transmitted multiplexed signal and at b the received multiplexed signal, and which are used to explain the rearrangement of information and the rearrangement of the signalling respectively, for a single loop.
Figure 4:
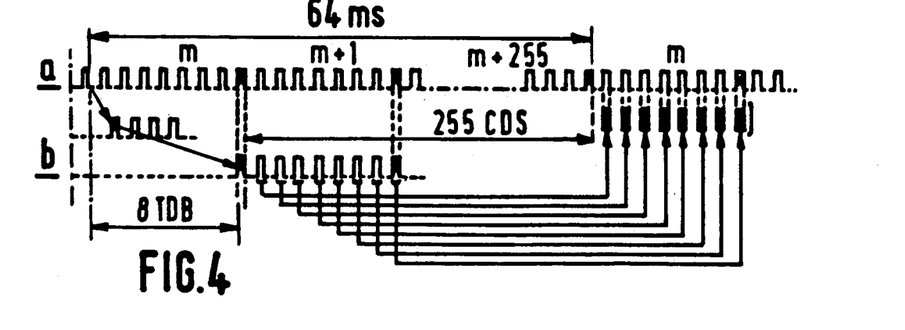

The FIGS. 3 and 4 show at a the transmitted multiplexed signals and b the received multiplexed signals.

The rearrangement of information signals, see FIG. 3, consists of repositioning the received information bits to their precise ranks in the transmission base frames. In FIG. 3 the 8 base frames are referenced 0 to 7. The transmission delay is referenced RT. In order to take into account that there may be a large number of concentrators in the loop 10, the rearrangement is realised over 8 base frames, that is, one signalling frame. This implies that the maximum permissible delay for the loop is 2048 bits, or 250 µs. Whatever the transit time of the multiplexed signals in the loop, within the aforesaid maximum, in this way the rearranging apparatus 1 automatically shifts the information bits received over the transmission channels CE in accordance with the next 8 base frames. This fact normalises a fixed information transmission delay for the entire loop, including the passage through the rearranging apparatus 1. Referring again to FIG. 2, it will be noticed that the memory MEM, owing to its storing capacity and its read/write sequence, operates to normalise tis delay to the fixed value of 8 base frames for the time-division multiplexed signals throughout the loop.

The rearrangement of the signalling signals (distributed slow-rate time slots S per octet of base frames), see FIG. 4, permits to take off, by means of the delay unit 35, the contents of the signalling channels CS of the multiplexed signal received by the rearranging apparatus 1, so as to place them back with the same rank into the next multiframe of the transmitted multiplexed signal. Hereinbefore it has been shown that the rearranging of the information signals permits to rearrange the entire received multiplexed signal by a constant amount equal to the duration of one frame, or one signalling channel.

With respect thereto, the rearrangement of all the received signalling channels is effected by delaying to the octets concerned by a systematic delay which is equivalent to the duration of: $256-1=255$ frames, or the duration of 255 CS channels at the end of the rearrangement of the information, so that the contents of these channels are repositioned in channels having the same rank in the next multiframe. The overall delay caused by this operation is also constant and equal to 64 ms over the whole loop, including the time for passage through rearranging apparatus 1. It is the delay means 35, see FIG. 2, which effects the rearranging of the signalling signals; it comprises (in a manner not shown) an eight-bit shift register whose input is connected to the output SM and whose output is connected to the data input of a memory device comprising 16312 one-bit words; the addresses of this memory are produced by a modulo-16312 counter. The output of the memory is connected to the input of an eight-bit shift register whose output is connected to a second input terminal of the switch 40. A control highway CO from circuit 31 commands with the appropriate sequences, over each of the 4 conductors, each of the four aforesaid elements, within the delay unit 35 in order to adapt the binary rates of the channels CS between the multiplex and the memory. For more details about the single loop system described hereinbefore, the reader be referred to French Patent Specification 2 526 614 mentioned above, incorporated as a reference in this description.

The present invention permits to enhance appreciably the capacity of the system by adopting a system having a plurality of loops, whilst these loops can remain independent and identical with the loop described hereinbefore as regards the mode of operation and technology used, and interconnected in any desirable way so that among other things a given user in the system can communicate with any other user.

In order to interconnect the loops, at least a single central unit called a superpilot is provided through which each of the loops pass.

In order to improve the security of the system various identical superpilots can be provided, of which only one is active at any time, whilst the others have stand-by status and are thus transparent to the multiplexed signals passing through.

Figure 5:
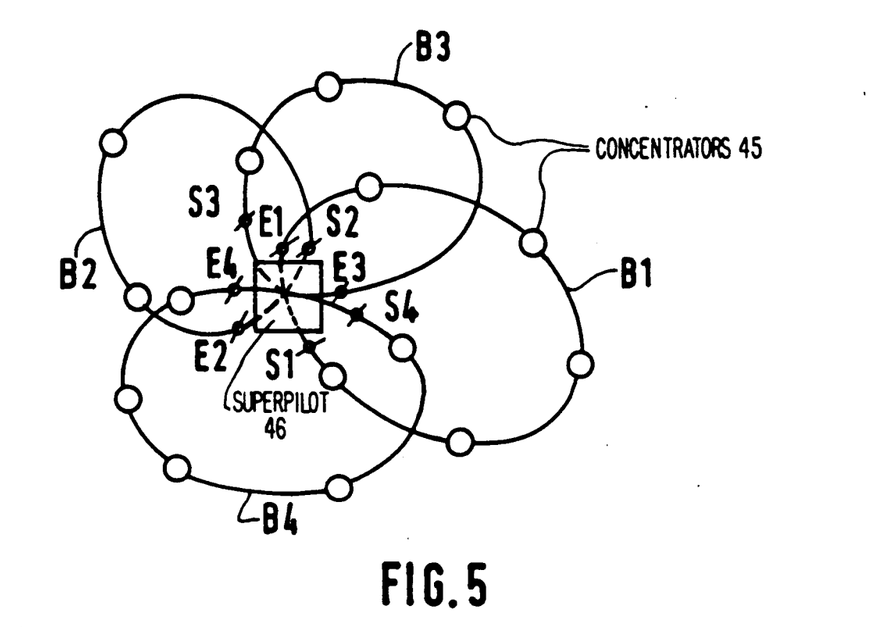
FIG. 5 shows a network of 4 loops which can be interconnected according to the invention in a central apparatus called superpilot.

The system in FIG. 5 has 4 loops B1, B2, B3, B4 which are similar to the loop of FIG. 2. Each loop comprises a certain number of concentrators referenced 45, which number may be several dozen. In a detectable predetermined direction, over the input and output terminals, each loop passes through a central unit 46 called a superpilot which comprises the apparatus according to the invention for rearranging information. The input and output terminals E1 and S1 respectively, of the loop B1, for example, correspond to the input and output terminals 12 and 11 respectively, of the loop in FIG. 2.

Figure 6:
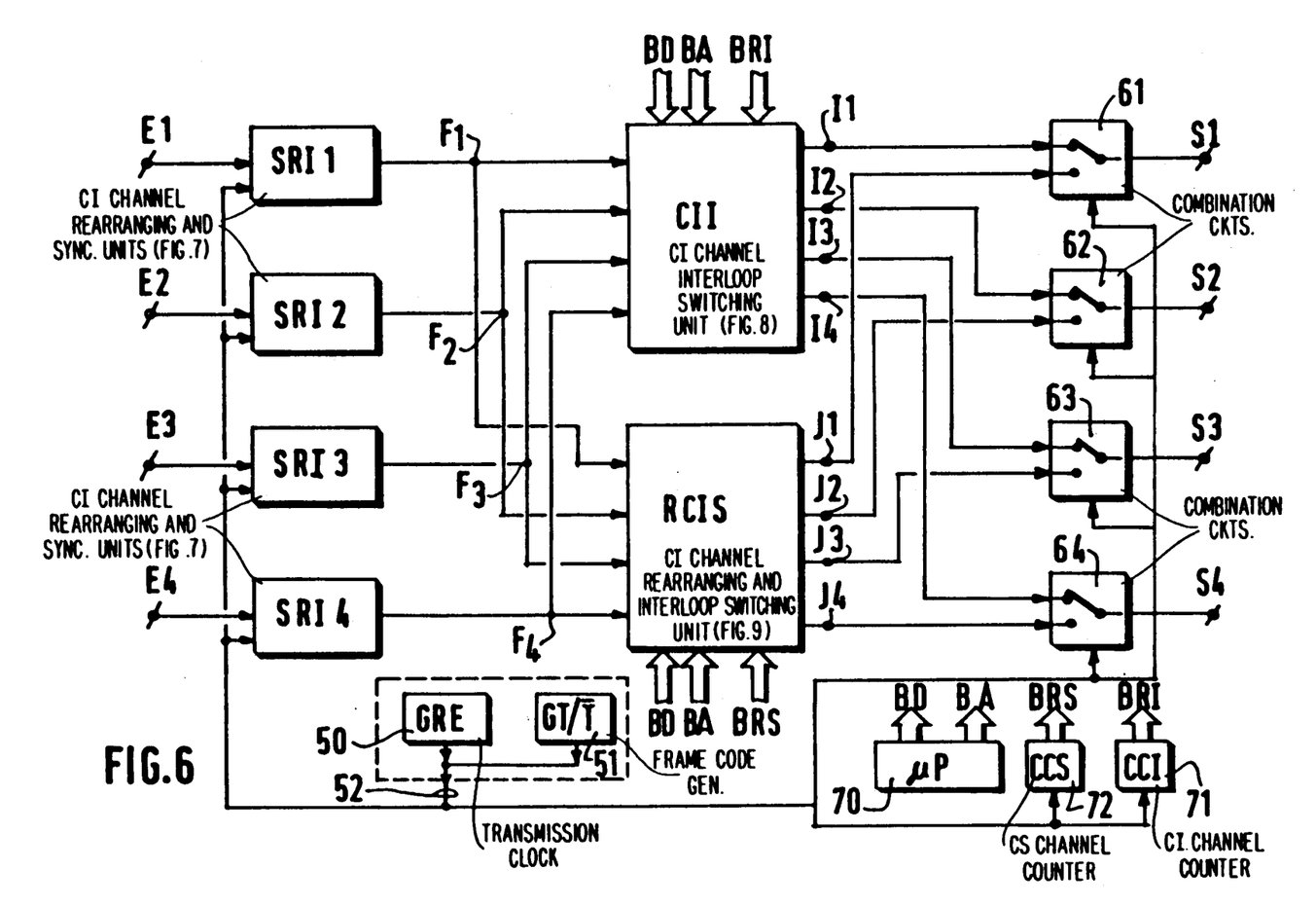
FIG. 6 is the general block diagram of loop interconnecting apparatus according to the invention.

A block diagram of the information rearranging apparatus for various loops, contained in the superpilot 46, is shown in FIG. 6. Therein the inputs E1, E2, E3, E4 and the outputs S1, S2, S3 and S4 are those in four loops of the FIG. 5. Each such input is connected to an apparatus for rearranging the information channels CI of the incoming signals and for synchronisation, SRI1, SRI2, SRI3, SRI4, which is to establish a delay of one frame, which is 250 μs, between the outgoing multiplexed signal produced at outputs S1, S2, S3, S4 and the corresponding output terminal F1, F2, F3, F4 of each SRI (outputs F). It should be observed that the time division multiplexed signals of the different loops are identical and, for example, such as described with reference to the FIGS. 1a and 1b. Also, the multiplexed signals at S1, S2, S3, S4 are synchronous and, consequently also synchronous with F1, F2, F3, F4, which is a necessity, for using the invention even when there is asynchronism of the incoming time-division multiplexed signals at the inputs E1 to E4. A block diagram of an SRI apparatus for rearranging and synchronisation signals of the CI channel is described hereinbelow with reference to FIG. 7. For example, each SRI is that which is described with reference to the left portion of FIG. 2 (elements 20, 21, 31, CA and MEM). In order to save storage capacity the SRI structure of SRI may alternatively be as described with reference to the left part of FIG. 3 of aforesaid French Patent Specification 2 526 614 which part is located between terminal 12 and the output SM therein. That structure, which saves storage capacity, is characterized in that the set of memories equivalent to the memory MEM of FIG. 2 of this application is formed by n (n>1) memories whose individual capacities are sufficiently large to contain a frame whilst the number of frames forming a multiframe exceed n, and in that means are provided for avoiding the same memory being addressed simultaneously by the read and write circuits.

Each SRI receives from a transmission timing generator GRE 50 (FIG. 6) and a generator 51 of frame code T and multiframe code T̄, GT/T comprising a quartz oscillator, the signals necessary for its operation. These signals are provided over a multiple conductor 52 which accommodates between 25 and 30 conductors, and may be considered clock signals. The SRI output terminals F1, F2, F3, F4 are connected to as many inputs of a unit CII and also to as many inputs of a unit RCIS. CII is an Interloop Information Switching unit. It does not cause any delay in the signals passing through; it is constituted in essence by a square switching matrix, in this case having 4 rows and 4 columns, thus 16 intersections comprising each a switch, and it is used to realise all the desired interconnections between loops for the information channels CI, channel-by-channel. Unit CII will be described hereinbelow with reference to FIG. 8; its outputs I1, I2, I3, I4 are connected to the first terminals of the combination circuits in this case two-way switches 61, 62, 63, 64 whose common terminals are connected to the respective outputs S1, S2, S3, S4 and which are controlled from the multiple conductor 52.

RCIS is an apparatus for Rearranging and Interloop Switching of the CS channel signals. Its twofold function is to rearrange the signalling channels CS of the incoming multiplexed signals into the outgoing multiplexed signals and also to realise all the interconnections desired between loops for the signalling channels CS. It should be observed that in general a signalling channel is assigned to an information channel, their respective serial numbers are not the same of necessity but in tis case the interloop interconnections realised for the information channel and the signalling channels are the same, that is to say, the same elementary loops forming the multiloop are passed through the channels CI and CS, but these configurations are spread in time with a periodicity and a form factor which are different. The unit RCIS, which constitutes the main item of the invention, comprises a set of delay units associated to a switching matrix, preferably of 4 rows and 16 columns, that is, 64 intersections comprising each a switch. The unit RCIS will be described hereinbelow with reference to FIG. 9; its outputs J1, J2, J3, J4 are connected to the respective second terminals of the switches 61, 62, 63, 64 whose switching sequences for transmitting an information channel bit or a signalling channel bit or octet are controlled from the transmission timing control bus 52.

Preferably, the open-close commands for the switches in the units CII and RCIS are provided in a simple way by data processing means 70 represented diagrammatically in FIG. 6. This is a μp or microprocessor, for example of the 68000 type manufactured by the American MOTOROLA company. The data bus BD and the address bus BA of the microprocessor are connected to the units CII and RCIS. There is also an information channel counter CCI, 71, controlled over via the conductor 52, and whose output bus BRI is connected to the unit CII. A signalling channel counter CCS, 72, also controlled via the conductor 52, has an output bus BRS connected to the unit RCIS.

Figure 7:
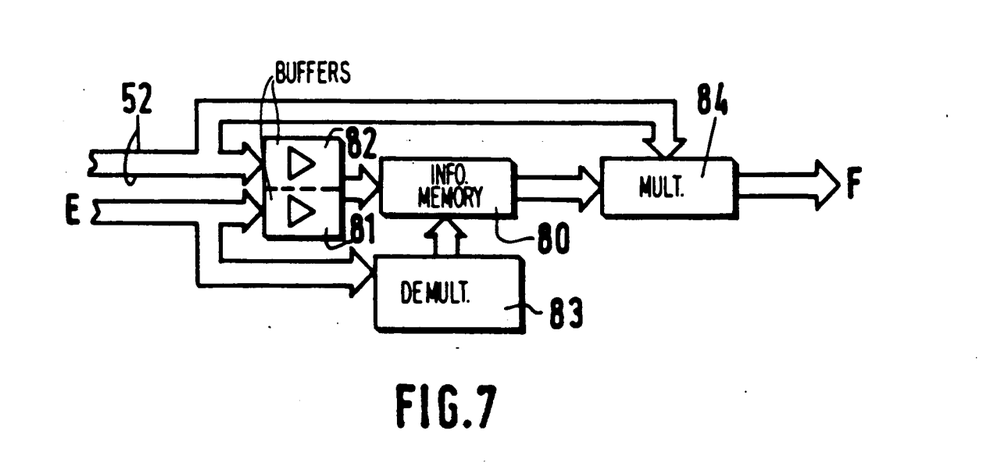
FIG. 7 shows the structure of a Synchronisation and Information Rearranging unit SRI.

In FIG. 7 is shown a block diagram an input unit SRI of the rearranging apparatus. This unit effects the rearrangement of all the multiplexed information signals of the loop passing through the unit and more specifically, the rearrangement of the channels CI by forming between the outputs S1, S2, S3, S4 of the apparatus and the output F of the SRI concerned a delay which is equal to a CS channel frame period, which is 8 base frames of the CI channel. The unit SRI comprises an information memory 80 receiving via buffer elements 81 and 82 the data of a time-division multiplexed signal of an elementary loop at its input E and the signals from the multiple conductor 52 constituting the transmission clocks and used for effecting the synchronisation already described hereinbefore. In order to bring the received data in phase again with the transmission time base, the memory 80, constituted by RAM modules, temporarily stores for each base frame in succession the received multiplexed signal before returning it in phase with the transmission clocks. This memory is thus addressed in the write mode by the clocks of the receive time base and addressed in the read mode by the clocks of the transmit time base. Preferably, in order to bring about an agreement between the time diagram of the received multiplexed signal and the time of the access to the memories, it is advantageous to demultiplex in pairs in a demultiplexer 83 the bits received at E so as to store two bits at each memory address. A multiplexing circuit 84 connected to the output of memory 80, controlled by the signals over the conductor 52, then arranges the outgoing bits of the memory 80 and thus produces at its output the rearranged information signal at terminal F. Each circuit SRI behaves as a delay line providing always the same frame transit time, that being 8 base frames ($t_{10}=250$ μs), in each loop whatever the amount of equipment (variable) inserted into the loop it controls.

Figure 8:
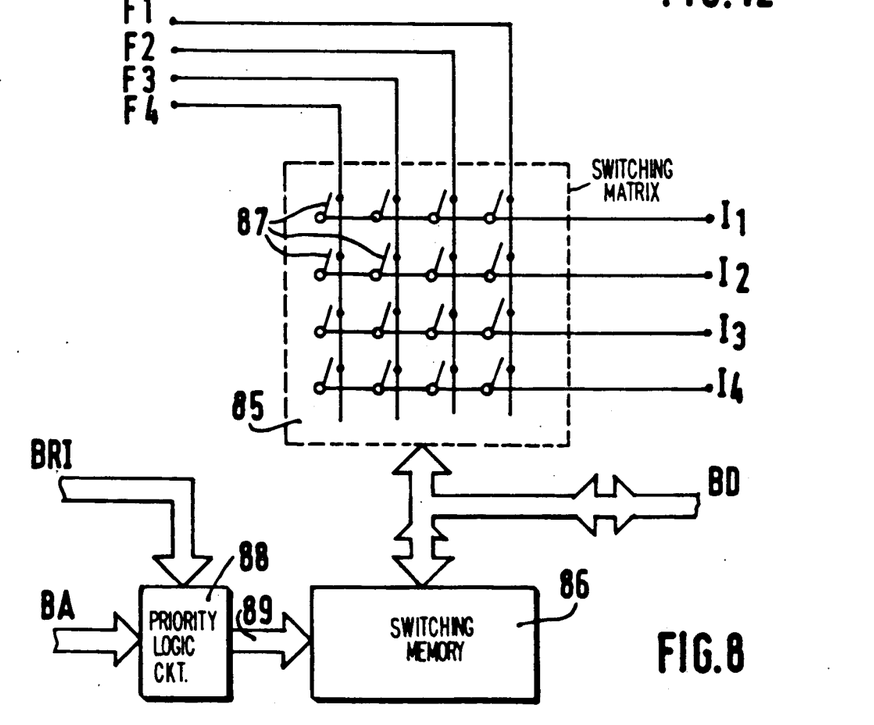
FIG. 8 is the block diagram of the Interloop Information Switch CII.

In FIG. 8, the information channel interloop switch CII is constituted in essence by a first switching matrix 85 and by a first switching memory 86. The columns of the matrix 85 are connected with the terminals F1, F2, F3, F4 and the rows with the outputs I1, I2, I3, I4 of the unit CII. At each intersection of the matrix a switch 87 is symbolised, each switch enabling the connection or the disconnection of a column line and a row line. A switch configuration between loops is realised when one switch per line and one switch per loop is closed. The closing times of the switches for a given configuration are spread in accordance with the delays caused by the units SRI inserted into the multiloop under discussion. These configurations are obtained on the basis of memory 86 activated in the read mode, the closing time of each interruptor being that of a CI, that is to say, one bit. The memory 86 contains at least 240 locations each one of which may contain several bits representing a switch configuration of the matrix; this memory is dynamically written from the two-way data bus BD coming from the microprocessor 70, and is addressed in the write mode via a random access over the address bus BA. The memory 86 is read at each clock bit period by means of clocking from bus BRI coming from the information channel counter CCI. Over a single bus 89 a priority logic circuit 88 makes the access of bus BA and that of BRI compatible to the memory 86. The memory 86 preferably comprises 256 words of 16 bits; for each of the 4 receive loops a 4-bit code determines one of the 4 information signals to be switched which have been rearranged at F.

Figure 10:
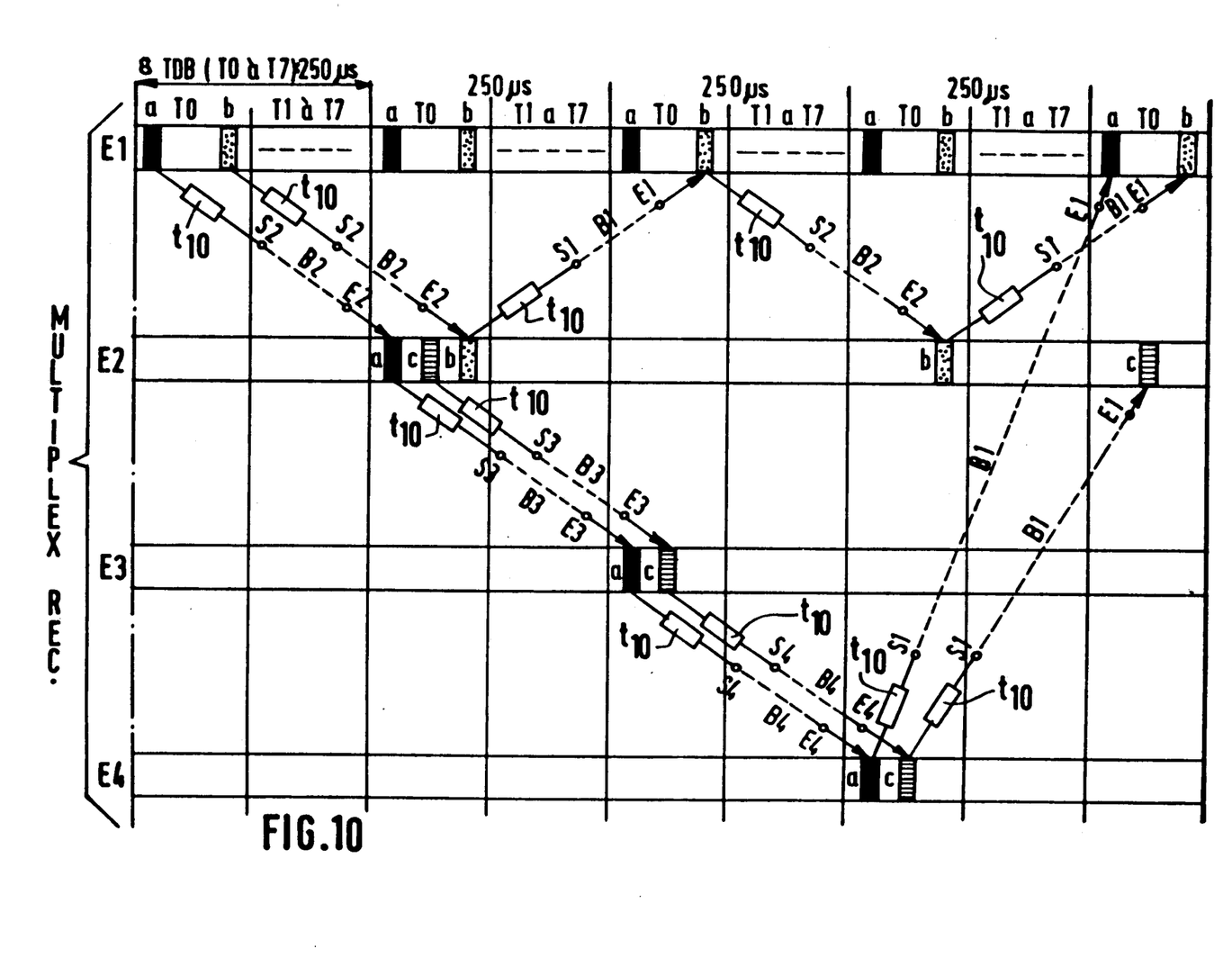
FIGS. 10 and 11 are the time diagrams which permit to explain the operations of the respective units CII and RCIS.

The switching operation of the multiloop information channels takes place in the following manner: a multiloop information channel is identified by the occupation of an information channel CI in each of the multiplexed signals of the loops it interconnects, as illustrated in FIG. 10. The transmission of information signals through 2, 3 or 4 loops for a given channel is realised by means of real-time transfer from one loop to the other of data transmitted in the timing paths assigned to this channel. The rank of the information channels CI used in each multiplex for supporting the multiloop information channel is the same in the multiplexed loops concerned. The duration of the interconnection (one or various adjacent CI channels) and the number of the channel used are determined by the software (microprocessor 70). The transit time of the information signals travelling in the interconnected loops is a multiple of the transit time $t_{10}$ of one loop, that is 500 μs for two loops, 750 μs for three loops and 1 ms for 4 loops.

FIG. 10 shows examples of multiloop information channels. An activation of the first control means (86, 87, 88, BD, BA, BRI) causing the desired interconnection between 2 (ITb), 3 (ITc) or 4 (ITa) loops by successively closing the respective switches corresponds with each time interval IT (a, b, c) representing a multiloop channel in the base frame (TO).

Figure 9:
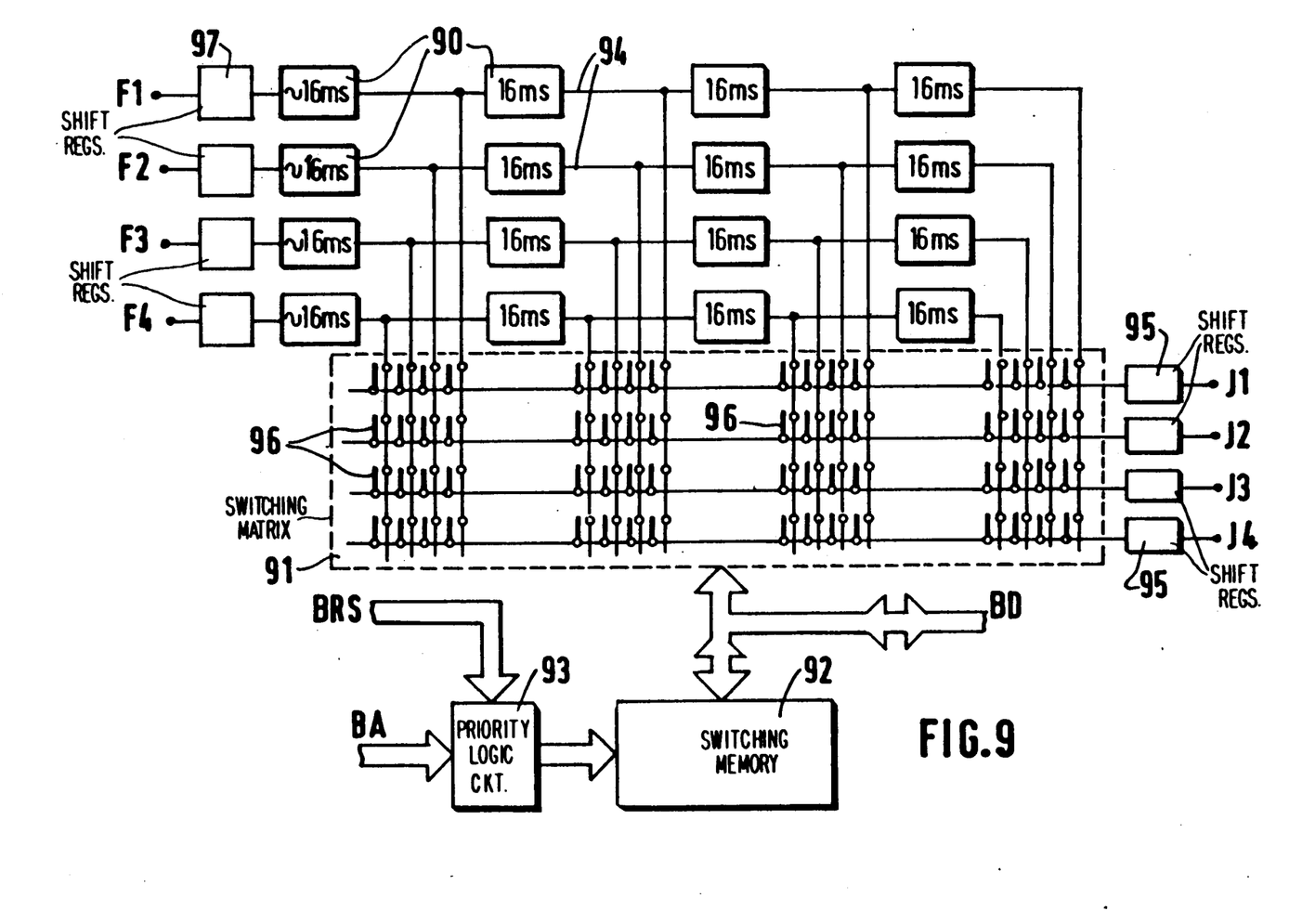
FIG. 9 is the block diagram of the Interloop Signalling Switch RCIS which effects the rearrangement of the signals in the CS channels.

The unit RCIS shown in FIG. 9 for rearranging the interloop switching the signalling channels CS comprises in essence delay units 90, a second switching matrix 91 and a second switching memory 92. The memory 92 belongs to control means which are analogous to the control means prepared for the unit CII: this memory is also written from the data bus BD with a random access address by the bus BA, via a priority logic circuit 93. Reading the memory is effected by means of clocking, from bus BRS coming from the signalling channel counter CCS and connected to memory 92, with a timing of channel periods CS. Each switching configuration 91 is maintained as regards the closing of each interruptor of the configuration for the duration of one channel CS, that is to say: either during the whole period of 7 successive base frames which do not contain the final synchronisation octet T, or during the periods S of the final octets of these 7 base frames.

Each input F1, F2, F3, F4 of the unit RCIS is connected to a transmission line comprising as many delay units 90 as there are loops, in this case 4. The output of each delay unit is connected to a column of the matrix 91 of which each line is connected to an output J1, J2, J3 and J4 of the unit RCIS, preferably through an 8-bit shift register 95. At each intersection of the matrix is symbolised a switch 96, each switch permitting to connect or disconnect a column line and a row line. The matrix 91 comprises 64 switches and, more generally $2^3$ switches for P elementary loops. The memory 92 is organised, for example, in 256 words of 16 bits. An interloop switching configuration for the signalling is realised when one switch per line, a single one that is, is closed during the separate time intervals with can be compared with the signalling information passing through the loops to be interconnected. Alternatively, each loop interconnection is effected by means of the software so that a multiple loop over its entire length passes through 4(p), that is, only 4(p), delay means 90 while each of these units 90 cause a delay which is equal to a quarter of the duration of the multiframe (16 ms), which is also the average duration of 4096 signalling bits (including the bits of the code T and $\overline{T}$). It should be observed that each input delay line, on the left in FIG. 9, causes a delay of 4024 bits, taking the fact into account that it is advisable to add to this delay the delay of 8 bits caused by an input shift register 97, and a delay (8 signalling or code T/$\overline{T}$ bytes) caused by the unit SRI arranged upstream. The signalling bytes contained in the rearranged signals of the 4 loops at F1–F4, are also delayed by approximately 64 ms by the delay lines 90 comprising intermediate taps having delays of 16 ms ($t_{11}$), 32 ms ($t_{12}$) and 48 ms ($t_{13}$), see FIG. 11. These delay lines are realised, for example, with RAM memory modules. The switching matrix 91 switches for each signalling channel the signalling octets from one of the 16 possible delay line outputs to the outgoing multiplexed signals of the 4 loops. A 16-bit-wide word of the matrix 92 corresponds with each switch configuration. This word is divided into 4 times 4 bits, each 4 bit-wide code determining for each of the 4 lines of the matrix, one of the 16 outputs of the delay lines to be switched.

The switching operation of the multiloop signalling channels CS takes place in the following manner: a multiloop channel is identified by the occupation of a signalling timing channel (channel CS) in each of the multiplex signals of the loops it interconnects. The transmission of signalling signals through 2, 3 or 4 loops, for a given channel is realised by real-time transfer from one loop to the next of data transmitted through the timing paths assigned to this channel, as this appears from FIG. 11 in which it will be observed that the ranks of the channels CS in the multiframes of the different loops are different of necessity. The duration of the interconnection and the rank of the channel used in each multiplexing are determined by the software used. Obtaining a propagation time of a multiloop signalling channel which is identical with that of a single loop signalling channel is effected by the particular structure and operation of the unit RCIS described above. Each switching configuration is established by the software on the basis of different parameters specifying the loops to be interconnected and the points of the delay lines 90 to be switched for each of the multiloop channels concerned. As has already been indicated hereinbefore, the switches of the multiloop channels are established in a manner such that the total of the transit times in each part of the lines which have been passed through is always equal to the period Tm of a multiframe (64 ms). The switching matrix 91 then permits to create multiloop channels which are independent and may serve the 2, 3 or 4 loops simultaneously. The multiloop signalling channels then have an access time which is identical with that of the single loop channels and can be used for controlling the communication between two users belonging to two different loops or more than two users in case of teleconferencing, for example, which may imply more than two loops.

Figure 11:
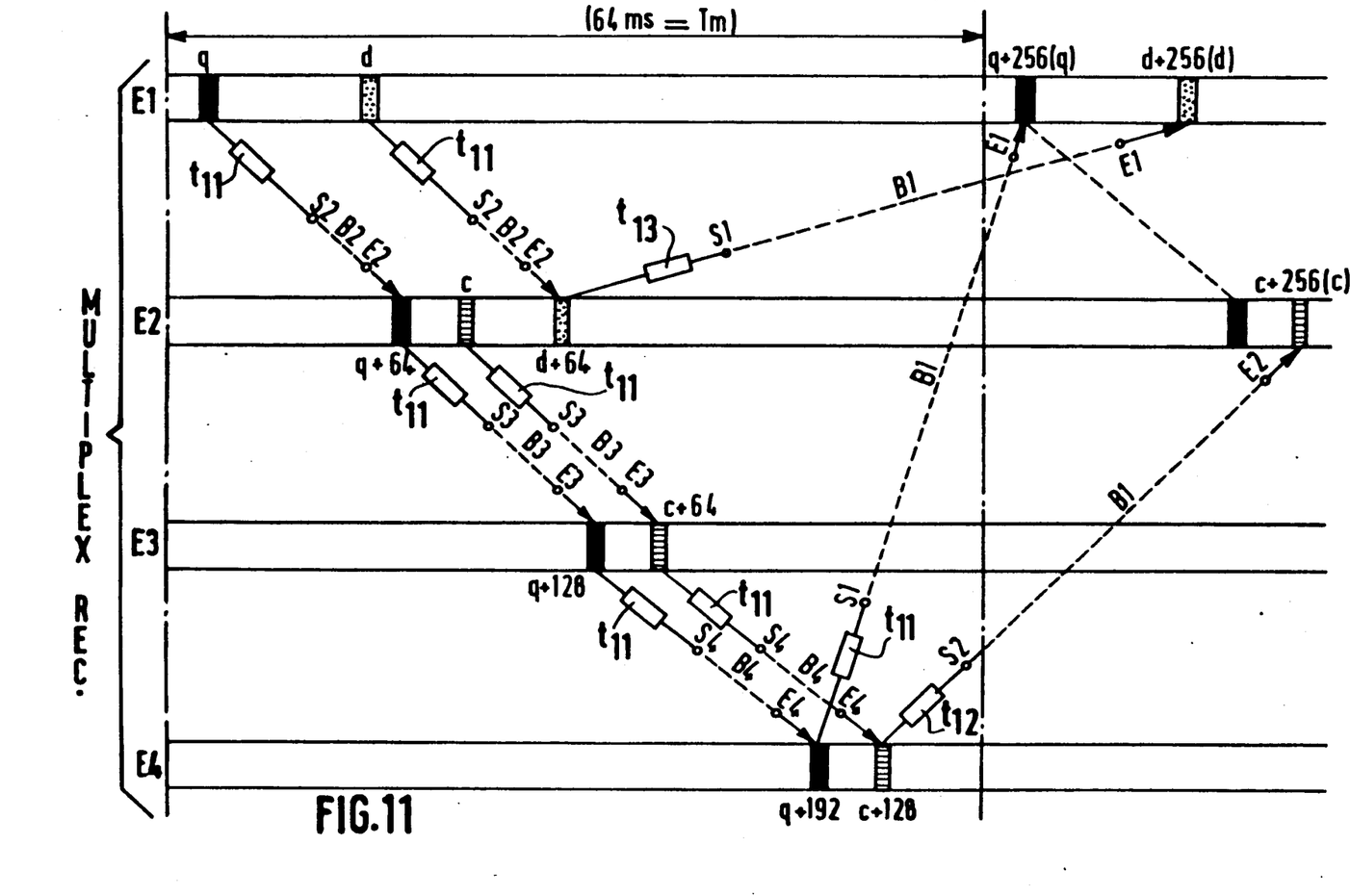

FIG. 11 shows three signalling channel CS switching configurations. The letters q, c and d symbolise an integer which indicates the rank of a signalling channel CS in a loop multiplex. It should be recalled for that matter that the periods $t_{11}$, $t_{12}$ and $t_{13}$ are equal to 16 ms, 32 ms, 48 ms respectively. When reading the rows L of the matrix 91 from top to bottom and the columns C from left to right, the configuration referenced q interconnecting the 4 loops implies the successive closing in steps of 16 ms of the switches L2-C4, L3-C3, L4-C2, L1-C1. The configuration c for three loops implies the successive closing of the switches L4-C2, L3-C3, L2-C5. The configuration d for two loops B1 and B2 implies the successive closing in alternate steps of 16 ms and 48 ms of the switches L2-C4, L1-C11.

The choice of management techniques of the multiloop channels is connected with the specifications as regards channel assignment as a function of their embodiments which themselves depend on different services to be rendered for a given system. These specifications are to specify, for example:
the number of dedicated channels (to an application)
the number of affected channels (dynamically or not)
the number of channels and pools and the number of pools (teleconferences).

In the case of dedicated channels the superpilot 46 (see FIG. 12) causes the interloop switchings to be effected by means of a microprocessor 70 (see FIG. 6) once the system is initiated, which permits to dispose of permanent multiloop channels. If the channels are managed as a pool, the request for a multiloop channel which is addressed to the superpilot through a concentrator is to contain information specifying the loops to be interconnected. It is on the basis of this information that the superpilot finds the available channels in the pool of the multiplex channels concerned which have the characteristic features necessary for the interconnection; this constitutes the dynamic allocation of the channels CI and CS. When the channels requested have been found, the superpilot performs the interloop switchings which permit to use the necessary multiloop information and signalling channels and answers back to the requesting concentrator. Then this concentrator receives from the superpilot the numbers of the multiloop channels which are assigned thereto for the duration of the interloop communication. Alternatively, at the end of the communication, these channels are freed by the superpilot which performs the corresponding switchings. The software processing of the interloop switchings for the channels CI and CS then permits a dynamic and very smooth two-way signalling for establishing communications in the network.

Figure 12:
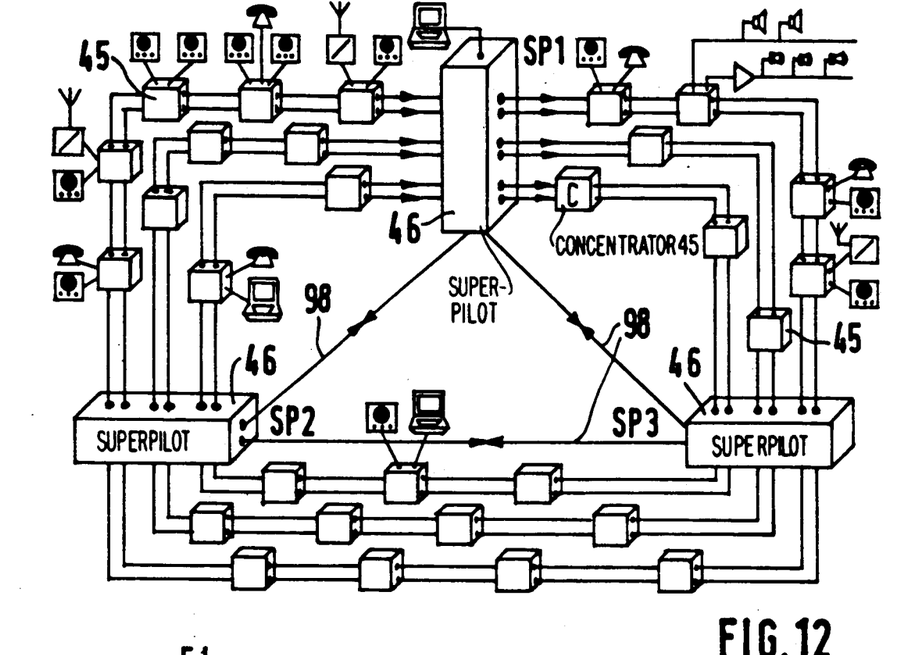
FIG. 12 shows a high-security multiloop network comprising three superpilots.

FIG. 12 shows the architecture of the system concentrating around 3 superpilot units 46 (SP1, SP2, SP3) which permit to interconnect 2 to 4 loops, in this case 3 loops comprising each up to 62 concentrators. Each loop of necessity passes through the 3 common nodes constituted by the 3 superpilot units owing to which the exchange of information between the loops is possible. The concentrator equipment 45 inserted into the loops is arranged in cascade by identical transmission supports which ensure the necessary digital links. Each user of the system is connected to at least one of these concentrators and communicates via one or various loops with the other users, as a function of their distribution in the network. The signals transmitted through the loops are preferably biphase encoded signals which permits to transmit only a single signal and to use without discrimination coaxial cable or optical fibre as transmission loop supports. With respect to this matter it should be observed that these transmission supports are doubled for each loop, according to FIG. 12, in order to augment the operation security. Actually, the latter arrangement permits when seizing loops partly (one information support) or completely (the two information supports), to realise loop configurations automatically by means of an active superpilot. The superpilot units ensure all the time division switching operations which permit to exchange signalling messages and to establish full duplex or half duplex information links in a single loop or between various loops. Special links 98 connect the 3 superpilots; they permit to establish outside the loops a direct dialogue between these three units one of which is normally active whereas the two other units are stand-by and ready to relay automatically one or the other if the active superpilot breaks down.

From a point of view of technology the switching matrices 85 and 91 may be realised in the following manner, for example, on the basis of integrated circuit components manufactured by the American company of FAIRCHILD
for the input and output interfaces of the matrices (columns, rows, connecting buses to the switching memory): D-flipflops of the F175 type
for realising switches on the basis of one closed switch per row (1 in 4 or 1 in 16): two-step combination of NAND gate circuits, F00 and F20.

If one wishes to enhance the capacity of the communication network described hereinbefore even more, two further possibilities are within the scope of the invention.

The number of loops may be augmented by bringing the number from 4 to 8 for example (adopting a multiple of 2 for the number of loops is to be preferred, which simplifies the manufacture and operation of the delay units 90). In this case the same multiplex as that described hereinbefore is retained as regards its structure and its rate.

Alternatively, while retaining, for example, 4 loops, the multiplex rate may be doubled bringing it to 64 kbits/s instead of 32 kbits/s, which then presents the additional advantage of being able to transmit the MIC encoded digital information in more than the differential encoding $\Delta$, only used at 32 kbits/s.

It should also be observed that, in addition to communications between users as shown by single-loop or multiloop configurations, it is also possible according to the invention to broadcast from the user station to any other user stations.

We claim:

1. Apparatus for rearranging information signals in channels of a multi-loop time division multiplex transmission system, so as to produce a plurality p of outgoing synchronous TDM signals from a plurality p of incoming asynchronous TDM signals; said TDM signals being of the same configuration and being in fast rate channels CI and slow rate channels CS, respectively; the channels CI being formed by time slots arranged in a base frame, the channels CS being formed by time slots distributed in successive base frames and arranged in a multi-frame comprising a plurality of base frames; and apparatus being characterized in that it comprises:

respective inputs $E1, E2, \ldots, E_p$ for the p incoming TDM signals, and respective outputs $S1, S1, \ldots S_p$ for the p outgoing TDM signals;

a plurality p of rearranging and synchronizing units SRI respectively connected to said inputs $E1, E2, \ldots E_p$ for synchronizing said incoming signals and rearranging the CI channels thereof;

an interloop switching unit CII for interloop switching of the CI channels, said CII unit including a first switching matrix;

each of said SRI units having an output which is connected to a respective input CII unit and which is further connected to a respective input of an RCIS unit for rearranging and interloop switching of the CS channels of the incoming signals;

said RCIS unit comprising delay units and a second switching matrix and having respective outputs which are paired with respective outputs of said CII unit, the respective pairs of outputs being connected to inputs of respective combination circuits;

the respective combination circuits having respective outputs which respectively constitute said outputs $S1, S2, \ldots S_p$, and being adapted to combine the pair of signals at the input terminals thereof, the so combined signals constituting said outgoing synchronous TDM signals of said rearranging apparatus.

2. TDM signal rearranging apparatus as claimed in claim 1, further comprising first control means for supplying first control signals to said interloop switching unit CII to cause it to establish an interloop switching configuration which is distributed in time for each channel CI depending on the loops to be interconnected and such that in each row of said first switching matrix a switch connected to one of said outputs of said CII unit is closed.

3. TDM signal channel rearranging apparatus as claimed in claim 2, wherein said first control means comprises a first switching memory containing interloop switching configurations for the CI channels and which are activated when such switching memory is in the read mode, such switching memory being written from an address bus BA and a data bus BD connected to a central microprocessor, and being read from a bus BRI connected to a channel counter CCI.

4. TDM signal channel rearranging apparatus as claimed in any of claim 1, 2 and 3, wherein each of the p inputs of said rearranging and interloop switching unit RCIS for the CS channels is connected to a line comprising a plurality p of series-connected delay units, the output of each delay unit being connected to a column of said second switching matrix, each row of said second switching matrix being connected to one of the p outputs of the RCIS unit.

5. TDM signal channel rearranging apparatus as claimed in claim 4, further comprising second control means for supplying second control signals to said RCIS unit and which, at least during successive time intervals S constituting the respective CS channels, establish an interloop signalling switching configuration which is distributed in time depending on the loops to be interconnected and such that in each row of said second switching matrix one switch is closed, taking into account in the multiplexed outgoing signals the shifting of the ranks of the different CS channels used for said configuration, the sum of the resultant time intervals of said rank shifts being equal to a multi-frame of the outgoing multiplexed signals.

6. TDM signal channel rearranging apparatus as claimed in claim 5, wherein said second control means comprises a second switching memory which when activated in its read mode establishes the interloop switching configurations for the CS channels, said second switching memory being written from said address bus BA and said data bus BD connected to said microprocessor, and being read from a bus BRS connected to a channel counter CCS.

* * * * *